April 28, 1964 P. L. BILLARD ETAL 3,131,254

GAMMA CORRECTION METHOD FOR USE IN TELEVISION AND APPARATUS FOR CARRYING OUT THESE METHODS

Filed Oct. 5, 1960

INVENTORS
PAUL L. BILLARD
PIERRE MAGUER
BY Frank R. Trifari
AGENT 3,131,254
Patented Apr. 28, 1964

3,131,254

GAMMA CORRECTION METHOD FOR USE IN TELEVISION AND APPARATUS FOR CARRYING OUT THESE METHODS

Paul Louis Billard, Paris, and Pierre Maguer, Bourg-Dineault, Finistere, France, assignors to North American Philips Company, Inc., New York, N.Y., a corporation of Delaware Filed Oct. 5, 1960, Ser. No. 60,605
Claims priority, application France Oct. 27, 1959
4 Claims. (Cl. 178—5.4)

The present invention relates to a gamma correction method for use in television, in which the correction is carried out by means of a multiplication of the signal by a function of the low-frequency part of this signal. This correction is limited in frequency to a maximum value. In one method of the invention use is made of a device to scan a stereoptyed plate line by line by means of a flying spot and of a pick-up device for converting the luminous energy of the spot transmitted by the said plate into electrical signals.

In particular, the invention relates to the transmission of stereotyped plates (slides, films, and so on) by television, wherein the transmission is carried out by successively illuminating each point of the plate by means of a movable spot source usually from behind by means of a flying-spot tube. The variable luminous fluxes produced are captured by a suitable device, for example, a photo-electric cell or a photo-multiplier feeding the transmitter.

The invention has particularly for its object to provide a method of the kind set forth which satisfies better than prior devices the various requirements of practice and, in particular, to obtain not only a satisfactory image definition, even in details, but also an advantageous noise ratio.

For this purpose the method in accordance with the invention is characterized in that from the said signals a correction voltage is derived to act upon the control-means for the luminous intensity of the spot, so that optical multiplication of the luminous intensity of the spot is obtained in the plate, by the transmission factor of the plate for the point concerned of this plate.

The invention furthermore relates to a device required for carrying out the aforesaid method.

The invention will now be described more fully by way of example with reference to the accompanying drawing, wherein.

Figures 1, 2, 3:
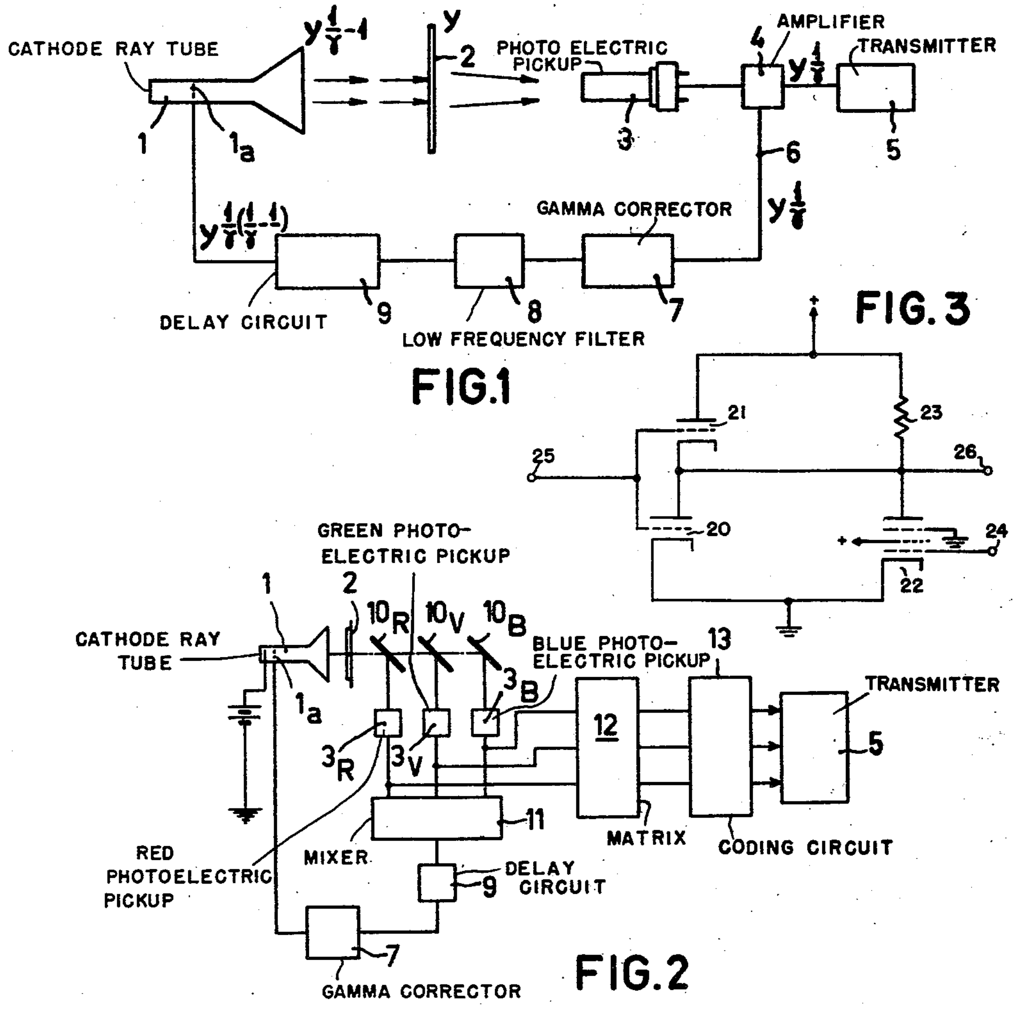
FIG. 1 is a diagram illustrating a transmitting apparatus according to the invention for monochrome television.
FIG. 2 is a diagram illustrating a transmitting apparatus according to the invention for color television.
FIG. 3 is a circuit diagram of a non-linear circuit that may be employed in the system of the invention.

It is supposed, by way of example, that the means, for producing the luminous spot for scanning line by line the plate 2, are formed by a cathode-ray tube known under the name of flying spot tube. This tube is designated by 1 in FIG. 1. However, the use of this tube 1 is not essential for the invention; equivalent means may also be employed. Moreover, the analysis could be carried out by reflection instead of being carried out by illumination from behind, the plate 2 being then replaced by a scene thus analysed.

When the light of the spot has traversed the plate 2, it strikes a photo-electric pick-up 3, for example a photo-multiplier. The electrical signals furnished by the latter feed the television transmitter 5, by way of an amplifying circuit 4.

According to the invention the signals at the output of the amplifier 4 supply a correction control-voltage which acts upon the spot intensity control (i.e. in practice upon a suitable electrode 1*a* of the tube 1), so that the desired correction is carried out in the plate 2 itself by optical multiplication of the luminous intensity of the spot thus corrected and of the transmission factor of the plate 2.

In other words use is made of a feed-back circuit to derive the correction voltage from the signals.

If the plate corresponds to an intensity Y (which intensity can vary from point to point on the plate) the fact that the signals are corrected at the transmitter end involves that they should have the form $$Y^{\frac{1}{\gamma}}$$

which is consequently to be found in the transmitter 5 at the input of the feed-back circuit 6.

In accordance with the invention this feed-back circuit includes a gamma corrector 7, which may comprise a circuit of the type illustrated in FIG. 3. This circuit, which is disclosed in U.S. Patent No. 2,956,113, comprises a pair of triodes 20 and 21 serially connected between a point of reference potential and a positive source of voltage. A pentode 22 is connected in parallel with triode 20, and a resistor 23 is connected in parallel with the triode 21. A first input terminal 24 is connected to the pentode control grid, a second input terminal 25 is connected to the grids of the two triodes, and an output terminal 26 is connected to the anode of the pentode. As disclosed in the above-mentioned patent, the output voltage of the circuit is equal to $-S_pR_aV_1$, where $S_p$ is the transconductance of the pentode, $R_a$ is the anode impedance of the pentode, and $V_1$ is the voltage applied to the grid of the pentode. The anode impedance is a nonlinear function of the voltage applied to grids of the triodes, which may be of the form $KV^{(1-n)}$, where K and $n$ are constants and V is the voltage applied to the triode grids. Thus, by applying the voltage derived from the amplifier to the triode grids of the circuit of FIG. 3, an output voltage may be obtained providing a correcting factor of $$\left(\frac{1}{\gamma}-1\right)$$

where $(1-n)$ equals $$\left(\frac{1}{\gamma}-1\right)$$

This circuit includes, moreover, the low-frequency filter 8, and a suitable delay element 9, which will be described more fully hereinafter. This at the output of the element 9 a filtered, delayed voltage is obtained, which has the form of $$Y^{\frac{1}{\gamma}\left(\frac{1}{\gamma}-1\right)}$$

The slope of the characteristic curve of the flying spot tube 1 is supposed, in order to simplify the description, to be equal to the $\gamma$-value of the receiver and hence the luminous intensity of the spot is given by:

$$Y\left(\frac{1}{\gamma}-1\right)$$

Consequently, if in the plate 2 optical multiplication is carried out, the intensity of the light transmitted through the plate 2 is given by:

$$Y\left(\frac{1}{\gamma}-1\right)\cdot Y=Y^{\frac{1}{\gamma}}$$

which light is captured by the photo-multiplier 3. The order of succession in which the elements 7, 8 and 9 are included in the feed-back circuit is not material to the invention.

The feed-back circuit itself delays the signal by a period of a few $\mu$seconds and in order to eliminate this effect the invention provides the introduction of the delay element 9 (cable or crystal), which increases the delay concerned to the duration of the scan one line of the plate 2. The filter 8 may be omitted, if the delay element effectuates, as usual, a sufficient filtering effect on the low frequencies. The delay may, of course, amount to a plurality of lines. This is advantageous to elimiate interferences in the signal.

The apparatus shown in FIG. 1 may be readily adapted to colour television purposes using a trichrome method; it may be constructed in the form shown in FIG. 2 and in the case of trichrome television it has particular advantages in that a single correction device acts simultaneously upon the three primary colour signals.

The gamma correction usually employed in trichrome television has two functions, i.e. the correction of the brightness scale as in monochrome television and the provision of the required linearity for a satisfactory colour reproduction. Usually each scanning mechanism for each colour has its own gamma corrector which is independent of the other correctors and similar to those used in monochrome television.

Consequently, three gamma correctors are to be used which should be strictly identical (which can be obtained only with difficulty), in order to avoid colour changes which would be particularly visible in the grey portion of the picture to be reproduced. On the other hand it is not possible to obtain a non-linear transmission curve without producing saturation or desaturation in the colours, so that information is lost in the grey portion of the picture by reduction in the brightness scale. Morever an assembly with three gamma correctors is fairly complicated.

The disadvantage may be mitigated by carrying out the correction in two separate operations, which are independent of each other and which apply to the luminance and to the colour respectively.

The first correction is, in fact, the transposition of FIG. 1 in the case of three primary colours, i.e. red (R), green (V) and blue (B). In FIG. 2 the same elements are designated by the same references. In this case dichroic mirrors $10_R$, $10_V$, $10_B$ or equivalent means, serve to dissociate the three primary colours which are captured by the three pick-ups $3_R$, $3_V$ and $3_B$ respectively. A mixing element 11 mixes, in suitable proportions, the signals V, R, B to furnish a combined signal (which may, for example, be the conventional luminance signal L), which combined signal is fed to a non-linear circuit 7 with the power index $$\frac{1}{\gamma}-1$$

and produces the voltage applied to the electrode 1a of the tube 1. In this case the delay line 9 operates also as a filter, as stated above with reference to FIG. 1. Under these conditions, as in FIG. 1, the desired optical multiplication in the plate 2 is obtained for the desired correction and from the three output circuits of the pick-ups $3_R$, $3_V$, $3_B$ are obtained signals:

$$L^{\left(\frac{1}{\gamma-1}\right)}.B,\ L^{\left(\frac{1}{\gamma-1}\right)}.V,\ L^{\left(\frac{1}{\gamma-1}\right)}.R$$

whereas the mixing element 11 supplies the signal $$L^{\left(\frac{1}{\gamma}\right)}$$

whilst $L=aR+bV+cB$ which symbols have the conventional meanings.

It is evident that the correction carried out with the luminance signal is in this case strictly applied in the same manner to each colour path.

Since there are no variations in the colours, which would thus be too saturated, provision is made at 12 at the output of the pick-ups $3_R$, $3_V$, $3_B$ of a matrix acting only upon the colour saturation. This correction is not sharp, but in practice it is sufficient. The signals are then fed to a coding element 13 (for example for the NTSC system) and then to the transmitter 5.

As stated above, the mixing element 11 may be designed to furnish the conventional NTSC luminance signal, but it will be evident that important luminance distortions may then occur in the saturated colours.

Particularly the brightness of the primary blue would be multiplied by 4.85. Consequently there would be a great colour shift. This may be reduced to a certain extent by a suitable choice of a mixed signal L' instead of the conventional signal L to act upon the flying spot tube 1.

For example, by means of a signal L' of the form:

$$L'=0.45R+0.33V+0.22B$$

a marked advantage is obtained as compared with the method according to the invention in which use is made of the conventional signal L, since the said luminance shift drops below 20% for nearly all the colours of the usual shades (with the exception of those in the immediate neighbourhood of the primary blue, with which the luminance is multiplied by 2.4). As a matter of course, the primary colour coefficients in the composition of the signal L' may be adjusted in accordance with the nature of the scene or with the quality of the film to be transmitted.

The matrix 12 has to fulfill certain conditions. Since it is a linear element, it can perfectly correct only the saturations produced by the non-linearity of the circuit for certain privileged shades. Since the coefficients of the matrix depend upon the choice of these shades, the following matrix is given only by way of example; in this case it is advisable to use it to obtain a satisfactory reproduction in the region of the skin colours and of the azure.

$$R''=0.75R'+0.15V'+0.10B'$$
$$V''=0.18R'+0.72V'+0.10B'$$
$$B''=0.18R'+0.15V'+0.67B'$$

The signals R'', V'', B'', thus obtained, have identical properties with respect to the signals obtained by the conventional method in which three gamma correctors are employed.

The method described above has, moreover, the advantages referred to with respect to monochrome television, i.e. the improvement in definition and the reduction of noise in the dark or saturated shades. The latter advantage is particularly important in the red and blue colours.

If desired, the desaturating matrix 12 and the coding element 13 may be combined to form a single member.

Hitherto it has been understood that the "gamma" to be corrected corresponds to the slope of the transmission curve of the display tube with logarithmical coordinates. However, a slight deviation from this definition is allowed by introducing by means of the apparatus shown in FIG. 2 a correction which is, strictly speaking, not a gamma correction, but which is a correction applied at will for other purposes, when the values and/or the characteristic of the elements are varied.

Thus, for example, the correction concerned may be intended to obtain an improved compatibility of a colour television system with the monochrome system with respect to the system hitherto known. The coefficients of the combined signal L'', replacing the signal L, and those of the matrix are to be designed accordingly. On a first approximation the coefficients stated above for L', R'', V'' and B'' are already better for the last-mentioned purpose.

What is claimed is:

1. A system for providing a non-linear correction for television signals, comprising image plate means having an image to be televised, a source of variable luminous flux, means for successively illuminating each point of said plate means in a line by line fashion, means for converting the luminous flux of the illuminated points of said plate means into electrical signals, non-linear circuit means for providing an exponential correction factor $$\frac{1}{\gamma}-1$$

wherein $$\frac{1}{\gamma}$$

is the desired correction factor for said electric signals, said non-linear circuit means having an input circuit and an output circuit, means for applying said signals to said input circuit, and means for connecting said output circuit to said source of flux for varying the intensity of said flux.

2. A system for providing an exponential correction factor $$\frac{1}{\gamma}$$

for television signals, comprising image plate means having an image to be televiseed, flying spot scanner means for providing a line by line scanning spot of luminous flux on said plate means, means for converting the luminous flux of the illuminated points of said plate means into electrical signals, non-linear circuit means for providing an exponential correction factor $$\frac{1}{\gamma}-1$$

means applying said electric signals to said non-linear circuit means, and delay circuit means connecting the output of said non-linear circuit means to said flying spot scanner means for varying the intensity of said luminous flux, whereby said electric signals have the form $$Y^{\frac{1}{\gamma}}$$

said delay circuit means and non-linear circuit means having a total delay of at least one line of said plate means being scanned.

3. A system for providing a non-linear correction for color television signals, said system comprising image plate means having an image to be televised, flying spot scanner means for providing a line by line scanning spot of luminous flux on said plate means, a plurality of means for converting the luminous flux of the illuminated points of said plate means into a plurality of electric signals corresponding to different colors of said image, means for combining said signals in predetermined proportions, non-linear circuit means having a power index of the form $$\frac{1}{\gamma}-1$$

wherein $\gamma$ is a constant, means applying said combined signals to said non-linear circuit means, means applying the output of said non-linear circuit means to said scanner means to control the intensity of said luminous flux, and output circuit means connected to the outputs of said converting means.

4. A system for providing a non-linear correction for color television signals, said system comprising image plate means having an image to be televised, flying spot scanner means for providing a line by line scanning spot of luminous flux on said plate means, a plurality of means for converting the luminous flux of the illuminated points on said plate means into a plurality of electric signals corresponding to different colors of said image, means for combining said electric signals in predetermined linear proportions, non-linear circuit means and delay circuit means serially connected between said combining means and flying spot scanner means for varying the intensity of said luminous flux, said non-linear circuit means and delay circuit means having a total time delay at least equal to the line scanning time of said scanning spot, said non-linear circuit means having a power index of the form $$\frac{1}{\gamma}-1$$

wherein $\gamma$ is a constant, and matrix means connected to the outputs of said converting means for linearly combining said electric signals to provide output signals.

References Cited in the file of this patent

UNITED STATES PATENTS

| | | |
|---|---|---|
| 2,743,310 | Schroeder et al. | Apr. 24, 1956 |
| 2,831,052 | Boothroyd | Apr. 15, 1958 |
| 2,962,545 | Dillenburger | Nov. 29, 1960 |
| 2,977,407 | Hirsch | Mar. 28, 1961 |